United States Patent [19]

Martin et al.

[11] Patent Number: 5,716,680
[45] Date of Patent: Feb. 10, 1998

[54] SOLVENTLESS PROCESS FOR FORMING THIN, DURABLE COATINGS OF PERFLUOROCARBON IONOMERS ON VARIOUS POLYMERIC MATERIALS

[75] Inventors: Charles W. Martin, Central, S.C.; Stan H. Baker, Lake Jackson, Tex.; Terry D. Gordon, Angleton, Tex.; Melisa Davila, Lake Jackson, Tex.; Paul R. Peters; John P. McGraw, Jr., both of Denham Springs, La.

[73] Assignee: The Dow Chemical Company, Midland, Mich.

[21] Appl. No.: 625,984

[22] Filed: Apr. 1, 1996

Related U.S. Application Data

[63] Continuation-in-part of Ser. No. 404,480, Mar. 14, 1995, abandoned.

[51] Int. Cl.$^6$ .................. B05D 3/12; B06B 1/20
[52] U.S. Cl. .............. 427/601; 427/222; 427/214; 427/340; 427/341; 427/379; 427/393.5; 427/412.1; 427/412.3; 427/412.4
[58] Field of Search .................. 427/222, 389.9, 427/393.5, 394, 214, 407.1, 412.1, 412.3, 412.4, 336, 337, 340, 341, 600, 601, 379

[56] References Cited

U.S. PATENT DOCUMENTS

| | | | |
|---|---|---|---|
| 3,072,618 | 1/1963 | Turbak | 260/79.3 |
| 3,577,266 | 5/1971 | Kirkland | 117/100 |
| 3,772,059 | 11/1973 | Shikada | 427/246 |
| 3,799,901 | 3/1974 | McCann et al. | 260/29.6 |
| 4,169,024 | 9/1979 | Fang | 204/98 |
| 4,243,504 | 1/1981 | Fang et al. | 204/296 |
| 4,348,310 | 9/1982 | Silva et al. | 524/167 |
| 4,433,082 | 2/1984 | Grot | 524/755 |
| 4,453,991 | 6/1984 | Grot | 156/94 |
| 4,454,176 | 6/1984 | Buckfelder | 427/246 |
| 4,470,859 | 9/1984 | Benezra et al. | 156/155 |
| 4,661,411 | 4/1987 | Martin et al. | 428/421 |
| 4,666,573 | 5/1987 | DuBois et al. | 204/98 |
| 4,680,101 | 7/1987 | Darlington et al. | 204/295 |
| 4,720,334 | 1/1988 | DuBois et al. | 204/296 |
| 4,731,263 | 3/1988 | Martin et al. | 427/385.5 |
| 4,741,744 | 5/1988 | Wu et al. | 55/16 |
| 4,791,081 | 12/1988 | Childress et al. | 502/62 |
| 4,990,252 | 2/1991 | Tomaschke et al. | 427/246 A |
| 5,082,472 | 1/1992 | Mallouk et al. | 55/16 |
| 5,082,697 | 1/1992 | Patton et al. | 427/340 |
| 5,094,895 | 3/1992 | Branca et al. | 428/36.91 |
| 5,110,385 | 5/1992 | Birdwell et al. | 156/155 |
| 5,136,474 | 8/1992 | Sarangapani et al. | 361/502 |
| 5,206,279 | 4/1993 | Rowland et al. | 524/379 |
| 5,211,984 | 5/1993 | Wilson | 427/115 |
| 5,234,777 | 8/1993 | Wilson | 429/33 |

OTHER PUBLICATIONS

Thin and composite high–flux membranes of perfluorosulfonated ion–exchange polymer vol. 54, pp.51–61; Journal of Membrane Science (1990) no month given.

Structure and related properties of solution–cast perfluorosulfonated ionomer films; Macromolecules 1987 vol. 20 pp.1425–1428, no month given.

Dissolution of Perfluorinated ion–containing polymers; Anal Chem. 1982 1639–1641, vol. 54, no month given.

Morphology and chemical properties of the Dow perfluorosulfoate ionomers; Macromolecules 1989 pp3593–3599 vol. 22, no month given.

Chemical and morphological properties of solution–cast perfluorosulfonated ionomers; Macromolecules 1988, pp. 1334–1339, vol. 21, No. 5.

Silane coupling agents for attaching nafion to glass and silica; Anal. Chem. 1986, pp661–662, vol. 58, no month given.

Rod like micellar structures in perfluorinated solutions J. Phys. France 1988, 2101–2109, vol. 49, no month given.

Swelling study of perfluorosulphonated ionomer membranes, Polymer 1993 vol. 34 No. 2, no month given.

Small angle neutron scattering of perfluorosulfonated ionomers in solution; Macromolecules 1986; pp2651–2653, vol. 19, No. 10, no month given.

Procedure for preparing solution–cast perfluoro–sulfonate ionomer films and membrane, Moore et al, Anal. Chem. 58, 1986 (pp. 2569–2570).

*Primary Examiner*—Erma Cameron

[57] ABSTRACT

A novel, improved process for forming a thin, adherent coating of a perfluorocarbon ionomer on a polymeric substrate which is typically in powdered form, fibrous form, or a mixture of powdered and fibrous forms, from a colloidal dispersion of the perfluorocarbon ionomer in a liquid medium which consists essentially of water and is substantially free of organic solvents, comprising adding a) the colloidal dispersion and b) a salt or a strongly ionizing acid to a vessel containing the polymeric substrate, and subjecting the dispersion, salt or acid and polymeric material to high shear conditions whereby a thin, durable coating of the perfluorocarbon ionomer is formed on the polymeric substrate.

12 Claims, No Drawings

SOLVENTLESS PROCESS FOR FORMING THIN, DURABLE COATINGS OF PERFLUOROCARBON IONOMERS ON VARIOUS POLYMERIC MATERIALS

CROSS REFERENCE TO RELATED APPLICATION

This is a continuation-in-part of application Ser. No. 08/404,480, now abandoned, filed Mar. 14, 1995.

The present invention relates to processes for forming thin coatings of ion-containing polymers on selected substrates, and to the articles made thereby.

The known ion-containing polymers include the sulfonated polystyrenes, copolymers of ethylene with alpha-beta unsaturated carboxylic acids such as acrylic acid or methacrylic acid and perfluorocarbon ionomers. The perfluorocarbon ionomers include those with sulfur-based functional groups, phosphorus-based functional groups and carboxylic acid or carboxylate functionality. All of these materials, with the exception of the phosphorus-based perfluorocarbon ionomers, are presently commercially-available.

The perfluorinated ionomers which have as the functional groups sulfonic acid groups or a salt thereof have been of particular interest, and commercial examples of such ionomers have been produced in the acid form by E. I. DuPont de Nemours & Co., Inc., under the Nafion™ trademark:

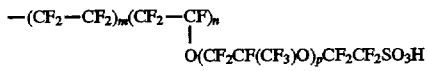

The Dow Chemical Company has produced ionomers having a shorter side-chain (acid-form) structure:

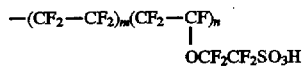

wherein m and n may again be the same or different.

The production of these ionomers is described widely in the literature, for example in U.S. Pat. Nos. 4,358,545 and 4,940,525, and is well known to those familiar with the perfluorinated ionomer art.

Dispersions of the perfluorosulfonic acid ionomers and of the perfluorosulfonate ionomers have been made previously by processes as described for example in U.S. Pat. No. 4,731,263 to Martin et al., U.S. Pat. No. 4,661,411 to Martin et al., U.S. Pat. Nos. 4,433,082 and 4,453,991 to Grot and the references cited therein, Moore and Martin, "Morphology and Chemical Properties of the Dow Perfluorosulfonate Ionomers", *Macromolecules*, vol. 22, pp. 3594–3599 (1989), and Moore and Martin, "Chemical and Morphological Properties of Solution-Cast Perfluorosulfonate Ionomers", *Macromolecules*, vol. 21, pp. 1334–1339 (1988). Dispersions of the Nafion™ ionomers are also available commercially in various equivalent weights which employ a lower alcohol/water combination as the liquid medium or solvent.

Thin films have previously been formed using these perfluorocarbon ionomer dispersions by evaporative coating techniques on various substrates, as best seen for example in the aforementioned Martin and Grot patents (suitable substrates being catalyst supports such as alumina, silica, zeolites, carbon etc., perhalocarbon- or glass-containing fabrics, ion exchange membranes or porous diaphragms, and wire or wire mesh electrodes), in U.S. Pat. Nos. 4,680,101 to Darlington et al. and 4,720,334 to DuBois et al. (on a diaphragm support), and in Szentirmay et al., "Silane Coupling Agents for Attaching Nafion to Glass and Silica" (on glass), *Analyt. Chem.*, vol. 58, No. 3, pp. 661–662 (March 1986).

None of the coatings produced by these earlier processes, however, have been entirely satisfactory. Especially in the case of substrates having an uneven or irregular surface to be coated, excessive amounts of the ionomer have been required to be employed to assure complete coverage of the substrate. The durability and strength of adhesion to the underlying substrate of these coatings have been less than desired, and with the exception of one embodiment from the Grot patent, each of the known processes has involved the use of an organic solvent of some type with the flammability and safety risks associated therewith.

The present invention concerns a novel and improved, solventless (that is, other than water) process for forming a thin, durable perfluorocarbon ionomer coating on a polymeric substrate which will typically though not necessarily be in powdered form, fibrous form or in the form of a mixture of powdered and fibrous materials, and in a most preferred embodiment, for forming one or more thin, durable coatings of a perfluorosulfonic acid form ionomer or of a perfluorosulfonate salt form ionomer on PTFE. Fundamentally, this improved, solventless coating process comprises adding a) a colloidal, surface active dispersion in water of a perfluorocarbon ionomer and b) a salt or a strongly ionizing acid to a vessel containing the polymeric substrate, with the salt or acid being added in an amount such that a solution results of a sufficient ionic strength to cause an adherent coating (which may be continuous but is not necessarily so) of the perfluorocarbon ionomer to be formed on the surface of the polymeric substrate under conditions of high shear or significant agitation, and subjecting the dispersion, salt or acid and polymeric material to such conditions whereby a thin, durable coating of the perfluorocarbon ionomer is formed on the polymeric materials. This coating is typically on the order of less than 100 nanometers thick, and desirably is on the order of 5 to 10 nanometers thick.

An optional additional step may involve exchanging the cation of the ionomer after the initial formation of the coating, as by contacting the dispersion-wetted substrate with the same or a different salt solution, for example with a potassium salt solution rather than a sodium salt solution, where the newly-exchanged form of the ionomer is less effective than the original form in coating the substrate initially but is more amenable to a particular end use or to further processing, or possesses a quality or property more fully than the original salt or acid form.

A further optional treatment may include filtering or otherwise segregating the coated polymeric material, followed by treatment of the coated polymeric material at an elevated temperature to provide improved coating adhesion of the ionomer coating to substrate or for enabling other thin, adherent ionomer coatings to be added, in a manner to be described below. Those skilled in the art will understand, parenthetically, that the "dispersions" in question have certain characteristics of true solutions, as noted in U.S. Pat. No. 4,433,082 to Grot; "dispersions" is consequently not to be construed as limiting of these liquid perfluorocarbon ionomer compositions.

The process of the present invention is considered useful for the perfluorocarbon ionomers generally, and other perfluorocarbon ionomers may be preferred for use in coating a particular polymeric substrate, but the process of the present invention will preferably employ colloidal, surface active dispersions of a perfluorosulfonic acid ionomer or perfluorosulfonate ionomer with an equivalent weight in the range of from about 500 to about 1500, and more preferably having an equivalent weight of from about 550 to about 1200. Of the known ionomers of this type, The Dow Chemical Company's shorter side chain ionomers having an equivalent weight of from about 550 to about 1000, and especially from about 550 to about 800, are presently particularly preferred because of their suitability for being dispersed in water only in high yields (where the yield is defined as the amount of ionomer solids which are effectively dispersed into the liquid solvent divided by the total amount of ionomer solids attempted to be dispersed) by a process described more particularly below.

Dispersions are commercially available or have been made previously of perfluorosulfonic acid or perfluorosulfonate ionomers of various equivalent weights in organic solvent-containing systems, as has been discussed previously. These dispersions may also be used in the solventless coating process of the present invention, but will require the removal beforehand of the organic solvent, for example, by distillation. Thus, beyond using the commercially-available, organic solvent-containing dispersions of the perfluorosulfonic acid and perfluorosulfonate ionomers, any known method generally for making colloidal dispersions of ionomers having these equivalent weights may suitably be employed, for example. dissolving solid ionomer in a mixture of water and a lower alcohol (for example, ethanol or propanol) at elevated temperatures and pressures in a closed vessel (such method being described in the aforementioned U.S. Pat. No. 4,433,082 to Grot).

Preferably, however, dispersions will be prepared which employ water only as the solvent. In this regard, the No. '082 patent to Grot does contemplate the possibility of making dispersions of up to 10 percent by weight of Nafion™-type perfluorosulfonic acid form ionomers in water alone (the ionomers having equivalent weights in the range of 1025 to 1500), at temperatures of at least 240 degrees Celsius in a closed vessel with stirring. The examples illustrating this process show pressures of upwards of 370 pounds per square inch, and yields in room temperature dispersions of about 27 percent (after 100 hours agitation at 240 degrees and 370 psi) and of 48 percent (after 18 hours at 235 degrees Celsius).

By contrast, room temperature dispersions containing from about 1 to about 3 weight percent of the aforementioned acid form, shorter side chain ionomers having equivalent weights of from about 550 to about 1000 can be prepared for use in a solventless (organic) coating process of the present invention with stirring in a closed vessel at temperatures of from about 170 to about 200 degrees Celsius, a pressure of from about 110 pounds per square inch, absolute (psia), and over a time frame of from about 1 to about 3 hours, with yields on the order of from about 70 percent to about 95 percent or greater being demonstrated for an 800 equivalent weight ionomer. Preferably a powdered, shorter side chain acid form ionomer is combined with water in a closed vessel, and heated to a temperature of from about 180 to about 185 degrees Celsius with stirring for about 2 hours, with the pressure being on the order of 145 to about 165 psia.

The substrates which may be coated with ionomers according to the solventless coating process of the present invention are numerous, and may desirably include, for example, fibers and powders of polytetrafluoroethylene, polyvinylidene fluoride, fluorinated ethylene-propylene copolymers (FEP), poly(vinyl chloride), polypropylene, chlorotrifluoroethylene or perfluoroalkoxyvinyl ether-tetrafluoroethylene copolymers (such as are sold under the designation Teflon PFA™ by E. I. DuPont de Nemours & Co., Inc.), as well as articles of these polymers which are of a size or dimension to be placed in a vessel and subjected to conditions involving high shear or other significant agitation with the dispersion and acid or salt, as by ultrasonication or the like.

A particularly preferred application however is for placing a coating or plurality of such coatings on polytetrafluoroethylene (PTFE) fibers and/or powders to make the PTFE fibers and/or powders water-wettable. In this regard, PTFE possesses a number of desirable attributes, including excellent chemical stability. A significant barrier has existed however to the use of PTFE in certain applications, for example in the development of nonasbestos diaphragms for chlor-alkali cells, due to the hydrophobic nature of PTFE.

Various efforts have been made to compensate for or to overcome the hydrophobic character of PTFE in chlor-alkali diaphragms through the incorporation of ion-exchange materials by other means. An example of these efforts may be found in U.S. Pat. No. 4,169,024 to Fang, wherein PTFE (or a similar fluoropolymer) in the form of a powder or fibers, in an unsupported porous or nonporous film, in a coating on an inert fabric or in a porous reinforced structure (that is, a diaphragm) is chemically modified by reaction with a sulfur- or phosphorus-containing compound.

U.S. Pat. No. 4,720,334 to DuBois et al. is also representative, and describes diaphragms containing from 65 to 99 percent by weight of a fibrillated fluorocarbon polymer such as PTFE and from 1 to 35 percent of fluorocarbon ionomer (preferably containing carboxylic acid, sulfonic acid, alkali metal carboxylate or alkali metal sulfonate functionality) based on the combined weight of fibrillated fluoropolymer and ionomer, and optionally further containing wettable inorganic particulate material. The diaphragm is dried and secured upon an underlying cathode by being heated to a temperature below the sintering temperature of PTFE for a time. The ionomer can be incorporated in the diaphragm by codeposition from a slurry with the ionomer being included as a solid, gel or solution, by being coated on either or both of the fluorocarbon fibrils and inorganic particulate and then deposited from a slurry, or by being extruded in admixture with the fluoropolymer before it is fibrillated. Specific coating processes for coating the PTFE fibrils are described, including mixing PTFE powder with a solution of ionomer in a water-miscible solvent under high shear conditions, then dispersing the coated fibrils by blending with water and some surfactant. Thereafter the materials are deposited onto the cathode from the resulting slurry.

A solventless coating process of the present invention employing only water as the liquid medium of the dispersion can be carried out in several ways depending on the ionomer type employed and the nature of the dispersion to be used. For example, for the preferred shorter side chain ionomers produced by The Dow Chemical Company, an integrated coating process would initially and preferably involve the preparation of a dispersion in water of from about 1 to about 3 percent by weight of a perfluorosulfonic acid form ionomer having an equivalent weight of from about 550 to about 1000, and especially from about 550 to about 800 inclusive, by the procedure described above.

Where the ionomer is a perfluorosulfonic acid ionomer of the Nafion™ type, initially a dispersion could be prepared in water of up to about 10 percent of an ionomer of an equivalent weight of from 550 to 1500, according to the process and under the conditions specified in U.S. Pat. No. 4,433,082 to Grot, or more commonly a commercially-available alcohol/water-based dispersion will be conventionally processed to remove the alcohol.

The resulting dispersion is then added with the requisite salt (in solid form or in solution with water) or strong acid to a PTFE powder, for example, which powder will preferably have been subjected to intensive shearing in water to produce uniformly-sized PTFE particles, or to preferably presheared PTFE fibers, or to a mixture of PTFE in powder/granular form and in the form of fibers. The mixture is then subjected to high shear conditions generally corresponding to a blade tip speed on an associated mixer of 800 ft./minute (240 meters/minute) or greater, for a time sufficient to coat the PTFE substrate with the ionomer and achieve a uniform slurry, with care being taken to not create such heat by excessive mixing/shearing as might cause the coated PTFE to begin to clump together. Preferably, the liquids in question are added to the PTFE, as opposed to the PTFE being added to the water or dispersion.

The resulting ionomer to PTFE solids ratio will generally be about 0.005 to 1 by weight or greater, preferably being from about 0.005 to 1 to about 0.015 to 1 and most preferably being approximately 0.015 to 1, with sufficient ionomer and PTFE being present for a given volume of water to achieve adequate shearing of the solids and coating of the PTFE by the ionomer. This minimum solids level can reasonably be expected to vary with different tip speeds and different mixing conditions and with different equipment, but can be determined through routine experimentation using as initial guides the examples below.

The result of this process is an evenly thin ionomeric coating which is sufficiently durable to be rinsed in water without being substantially removed, but which can be removed with mechanical abrasion. As indicated previously, the durability and strength of adhesion of the ionomer coating can be enhanced (to the point where the coating may not be removed with hand rubbing) where desired for a given use or application, by annealing the coated substrate at an elevated temperature below the decomposition temperature of the ionomer coating.

The optimum annealing temperature in a given application is generally dependent on both the structure and form of the ionomer and on the nature of the substrate. Adhesion of the coating to the substrate is generally improved by annealing near or above the glass transition temperature of the ionomer. More preferably, for achieving the greatest adhesion and durability with the ionomer coating of a polymeric substrate, the annealing will occur near the glass transition temperature ($T_g$) of an amorphous polymeric substrate or near the crystalline melting point of a crystalline polymeric substrate.

Thus, for PTFE coated with an 800 equivalent weight, shorter side chain perfluorosulfonate ionomer of the type made by The Dow Chemical Company (having an ionic $T_g$ of about 250 degrees Celsius), such as results, for example when NaCl is incorporated as the salt in the mixture to be sheared, the greatest degree of adhesion and durability is generally achieved with an annealing of the coated PTFE at a temperature of from about 330 to about 350 degrees Celsius for from one to 360 minutes, while for polyvinylidene fluoride substrates coated with the same ionomer, the preferred annealing conditions correspond to a temperature of from about 160 to about 170 degrees Celsius maintained for from one to 360 minutes.

It should be noted, however, that the benefits of enhanced adhesion may be offset to an extent in that with the re-orienting of the substrate surface under these conditions, some migration of the ionomer into the substrate can be expected with an attendant loss of some wettability, for example, in the sintering of a chlor-alkali diaphragm including ionomer-coated PTFE. Consequently, the adhesion and durability that can be achieved under selected annealing conditions for a given end use or application should be weighed against the effect of a decrease in wettability or some other property which may result, to determine whether it is desirable to achieve such enhanced adhesion and durability for the end use or application.

In the context of chlor-alkali diaphragms employing the above-described, preferred coated PTFE powder and/or fibers in some fashion, it has been found that these coatings in alkali metal perfluorosulfonate salt form are stable and (from preliminary data at least) remain satisfactorily wettable after exposure to the about 335 to about 350 degree Celsius temperatures at which the diaphragms are conventionally sintered and bonded, and that the coatings are essentially permanently adhered to the underlying PTFE substrate (to the point that ordinary cellophane adhesive tape applied to a coated and annealed PTFE coupon will not visibly remove the ionomer coating).

Preferably, a salt/water solution will be employed and combined with the dispersion and PTFE. Typically in excess of about 1 percent by weight of the salt will be employed in the mixture to be sheared, and preferably the salt will comprise from about 5 percent by weight of the mixture to saturation. Salts which have been found generally suitable for use in the present invention include cations such as hydrogen, alkali metals, alkaline earth metals and transition metals, ammonium and alkylammonium cations in water-soluble combinations with any anion such as sulfate, fluoride, chloride, bromide, iodide, carbonate, phosphate, acetate, hydroxide, nitrate or thiocyanate.

The sodium and magnesium salts have been found especially useful in forming essentially continuous coatings on substrates such as PTFE, with sodium chloride, sodium carbonate, sodium acetate and sodium bisulfate being still more preferred, although as suggested above, it may be desirable after forming the coating initially on a given polymeric material to exchange a different cation for the original cation in the ionomer through contacting the initially coated polymeric material with a solution of the different cation.

Acid solutions can also be used in the solventless coating process of the present invention and include solutions in water of those acids which are conventionally known or classified in the art as "strong" acids, for example, nitric acid, hydrochloric acid or sulfuric acid.

In certain applications of the present invention, where the performance or properties of the coated substrate are known to be or expected to be thickness-dependent to some extent, it will be desirable to employ more than one coating of ionomer. The process of the present invention can be adapted to provide a plurality of such coatings on a selected substrate by contacting the coated substrate with a second, salt solution involving a different cation (as suggested above) to increase the contact angle of the coated substrate prior to applying an additional coating of ionomer, and by heat treating the coated substrate to further raise the contact angle. Or, the heat treatment step alone may suffice to raise the contact angle of the substrate to an extent such that an additional coating may be applied. This heat treatment will generally be conducted at a temperature lower than that recommended for the annealing, adhesion-enhancing step, and preferably following deposition of the final coating the annealing step will be performed.

With respect to PTFE in particular, for purposes of achieving maximum water-wettability of the coated PTFE or for adding subsequent coatings thereto, it will be preferred to initially achieve a sodium exchanged perfluorosulfonate ionomer coating on the PTFE and to then contact the coated PTFE with a potassium or zinc salt solution, with the addition of subsequent coatings preferably also involving a heat treatment at an elevated temperature, for example, up to 300 degrees Celsius for 20 to 30 minutes.

Then the single-coated PTFE substrate is again subjected to high shear or significant agitation with the dispersion and sodium or magnesium salt, rinsed, exposed to the potassium or zinc salt solution, rinsed, heat treated and so on until the last coating is applied that is desired, with the final heat treatment being an annealing of the coated substrate.

ILLUSTRATIVE EXAMPLES

Examples 1–7

An 800 equivalent weight, short side chain ionomer was prepared by copolymerization of $CF_2=CF_2$ with $CF_2=CFOCF_2SO_2F$ in an emulsion polymerization system. The resulting polymer was isolated and dried, and hydrolyzed with NaOH to give a perfluorinated sodium sulfonate form ionomer. After being water-washed to neutrality, the ionomer was converted to the acid ($H^+$) form by exposure to hydrochloric acid. After again being water-washed to neutrality and air-dried, the ionomer was charged with water only to a 300 mL stirred Parr bomb reactor. The vessel was closed, and heated to a selected temperature with stirring for about 2 hours while monitoring the system pressure. After cooling to ambient temperatures, the amount of ionomer in the dispersion (and from this, the yield of ionomer in the dispersion) was determined by drawing off a 15 to 20 gram sample of the liquid composition, evaporating to dryness and weighing the residue. The results are shown in Table 1:

TABLE 1

| Ionomer, (g) | Water (g) | P, in Psig (MPa) | Temp (°C.) | Wt. % Ionomer | Yield (%) |
|---|---|---|---|---|---|
| 6.2 | 200 | 230–240 (1.6–1.7) | 200 | 2.74 | 92 |
| 2.28 | 72.89 | 162(1.1) | 185 | 2.68 | 89 |
| 2.35 | 76.04 | 163(1.1) | 185 | 2.68 | 89 |
| 2.31 | 74.93 | 163(1.1) | 185 | 2.63 | 88 |
| 2.21 | 71.46 | 145–163 (1.0–1.1) | 180–185 | 2.84 | 95 |
| 5.75 | 200.4 | 480–490 (3.3–3.4) | 240 | 2.67 | 93 |
| 6.2[a] | 200 | 230–240 (1.6–1.7) | 200 | 2.21 | 80 |

[a]Film form, all others being powders;

Example 8

Into a 50 gallon vessel were placed 292 pounds of water and 9 pounds of the ionomer employed in Examples 1–7, the ionomer having been converted as a powder to its acid form. The vessel was closed and heated at 180 to 185 degrees Celsius for 2 hours while stirring. The pressure was 130 psig. After cooling, the amount of polymer in the liquid phase was determined by evaporating a 15–20 gram sample to dryness and weighing the residue. The measured yield was 92 percent.

Example 9

The same vessel, ionomer and procedure were used as in Example 8, with 3 pounds of ionomer and 160 pounds of water being charged to the vessel. The temperature of this trial was 180 degrees Celsius, and the measured pressure reached 110 psig. The measured yield under these conditions was 98 percent.

Example 10

For this example, 45 grams of an acid form, shorter side chain ionomer of the type used in Examples 1–7 above, but having an equivalent weight of 980, was placed in a vessel with 1400 grams of water. The vessel was closed, and the water/polymer mixture heated with stirring to 196 degrees Celsius and a pressure of 189 psig for two hours. After cooling and evaporating a portion to dryness in the manner of Examples 1–7, the solids content of the dispersion was determined to be 2.82 percent by weight for a yield of from 94 to 95 percent (taking into account that the polymer when added to the vessel was not completely dried).

Examples 11–15

Teflon™ 7C PTFE powder was placed in a Waring blender equipped with a 2.5 inch blade, and a portion of 800 equivalent weight dispersions variously containing about 2 to 3 weight percent of the ionomer (but corresponding to an ionomer:PTFE ratio by weight on a dry basis of 0.015:1) in water was added with stirring at 14,400 ft./min. After stirring for ten minutes, a brine solution (pH of 11.0) was added and mixing continued for another ten minutes. Various weights and combinations were employed with success, as indicated by the PTFE remaining wetted after completion of stirring. The results are shown in Table 2 as follows:

TABLE 2

| | | Dispersion | | | | |
|---|---|---|---|---|---|---|
| PTFE, g | g | Wt. % Solids | Water, g | Brine, g[a] | Mix Time (min) | Wetted? |
| 50 | 25 | 3 | 0 | 150 | 1.5 | yes |
| 50 | 28 | 2.68 | 0 | 150 | 2 | yes |
| 50 | 25 | 3 | 110.9 | [b] | 2 | yes |
| 200 | 100 | 3 | 0 | 600 | 2 | yes |
| 50 | 39.5 | 1.9 | 0 | 150 | 2 | yes |

[a]At 9.4 percent by weight of NaCl;
[b]14.1 grams dry NaCl added instead of brine solution;

For purposes of comparison, several other trials were conducted which were not successful. The conditions of these trials are as found in Table 3:

TABLE 3

| | | Dispersion | | | | |
|---|---|---|---|---|---|---|
| PTFE, g | g | Wt. % Solids | Water, g | Brine, g[a] | Mix Time (min) | Wetted? |
| 20 | 11.2 | 2.68 | 250 | 0 | 2 | no |
| 20 | 11.2 | 2.68 | 0 | 298[a] | 2 | no[a] |
| 50 | 0 | n.a. | 0 | 150 | 2 | no |

[a]Neutral brine used at 9.4 wt pct. NaCl, some PTFE dispersed but majority not wetted;

In the first unsuccessful trial, it appeared that there was too much water present for an effective shearing of the PTFE/ionomer dispersion mixture. In the second unsuccessful trial, the abundance of brine contributed to foaming and a significant portion of the PTFE was carried unwetted in the foam. In the third unsuccessful trial, high shear alone was indicated to be insufficient to cause wetting of the PTFE absent the ionomer dispersion.

Examples 16–20

A number of trials were conducted also with a Cowles CM-100 laboratory dissolver (Morehouse-Cowles Inc., Fullerton, Calif. USA) at a base tip speed of from 2100 ft./min. to 2400 ft./min., with Teflon™ 7C PTFE powder and about 2 to 3 weight percent, 800 equivalent weight ionomer dispersions in water as used in Examples 11–15 above. Table 4 shows the conditions and weights corresponding to those trials which were successful (all at an ionomer:PTFE ratio of 0.015:1), with the last entry or trial being considered as providing the best results:

TABLE 4

| | Dispersion | | | | | |
|---|---|---|---|---|---|---|
| PTFE, g | g | Wt. % Solids | Water, g | Brine, g(a) | Mix Time (min) | Wetted? |
| 250 | 197.4 | 1.9 | 274 | 282 | 5 | yes |
| 250 | 197.4 | 1.9 | 274 | 282 | 15 | yes |
| 250 | 197.4 | 1.9 | 274 | 282 | 5(c) | yes |
| 250 | 197.4 | 1.9 | 274 | 282 | 15 | yes(d) |
| 250 | 136.4 | 2.75 | 550 | (b) | 15 | yes(e) |

(a)At 25 percent by weight of NaCl;
(b)70.5 grams dry NaCl added instead of brine solution;
(c)This trial conducted at 4700 ft./min. tip speed;
(d)3–4 drops of surfactant added;
(e)PTFE was presheared in this trial only to a desired particle size of 60 mesh or less, by shearing in 750 mL water at 3100 ft/min to 3300 ft/min for 15 minutes. Excess water (200 mL) was decanted off, the ionomer dispersion, dry NaCl and 0.75 grams NaOH were added, and the mixture sheared for 15 minutes at 2340 ft./min. tip speed.

Again, for purposes of comparison, several other trials were conducted which were not successful. The conditions and specifics of these trials are reported in Table 5:

TABLE 5

| | Dispersion | | | | |
|---|---|---|---|---|---|
| PTFE, g | g | Wt. % Solids | Water, g | Brine, g(a) | Mix Time (min) |
| 250/ 68.25(b) | 197.4 | 1.9 | 274 | 282 | 15 |
| 250 | 136.4 | 2.75 | 335 | 282 | 25(c) |
| 250 | 197.4 | 1.9 | 274 | 282 | 15(d) |

(a)At 25 percent by weight of NaCl;
(b)68.25 grams of 3.2 denier bleached PTFE fibers also were used, for an ionomer to PTFE ratio by weight of 0.012:1 as compared to the 0.015:1 used in all other trials;
(c)In this trial, the order of materials addition was reversed from other, successful trials, with the liquids being added first, then the PTFE. The PTFE was not well dispersed after 15 minutes at 2080 ft./min. tip speed, so the tip speed was increased to about 3250 ft./min. for 5 minutes without greater success. Final mixing at about 4550 ft./min. for 5 minutes was also unsuccessful in causing the PTFE to wet.
(d)The concentration of the solids in the dispersion was returned to the levels used in the first five successful trials, with the order of materials addition again being reversed. This trial was also not successful.

In the first unsuccessful trial, the ionomer:PTFE ratio was 0.012:1 as opposed to the 0.015:1 ratio used in other trials, and it appeared that there was too much PTFE material to mix adequately. In the second and third trials, the order of addition of materials was reversed, suggesting the criticality in the solventless coating process of the present invention of adding the liquid components of the process to the PTFE powder and/or fibers as opposed to the other way around.

What is claimed is:

1. A process for forming a coating of a perfluorocarbon ionomer on a polymeric substrate, comprising:
   adding a solution comprising a) a colloidal dispersion of a perfluorocarbon ionomer in a liquid medium which consists essentially of water, and b) a salt or a strongly ionizing acid selected from the group consisting of nitric acid, sulfuric acid and hydrochloric acid, to a vessel containing a polymeric substrate; and
   subjecting the solution and polymeric substrate to conditions of shear high enough to cause the perfluorocarbon ionomer to form a coating on the polymeric substrate;
   wherein the salt or acid solution is added in an amount such that the solution is of sufficient ionic strength to cause a coating of the perfluorocarbon ionomer to be formed on the surface of the polymeric substrate when the solution and polymeric substrate are subjected to the shear.

2. A process as defined in claim 1, wherein the dispersion, salt or acid solution and polymeric substrate are sheared at a temperature which is less than that required to form the dispersion initially.

3. A process as defined in claim 2, wherein the dispersion, salt or acid solution and polymeric substrate are sheared at about ambient temperature.

4. A process as defined in claim 3, wherein a perfluorosulfonic acid ionomer is employed as represented by

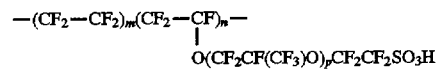

wherein m and n are the same or different and wherein p is an integer of 1 or greater, or by

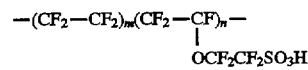

wherein m and n are the same or different, or which is an alkali metal-exchanged salt of one of these perfluorosulfonic acid ionomers.

5. A process as defined in claim 4, wherein the substrate is polytetrafluoroethylene, polyvinylidene fluoride, poly (vinyl chloride), polypropylene, a fluorinated ethylenepropylene copolymer, chlorotrifluoroethylene or a perfluoroalkoxyvinyl ether-tetrafluoroethylene copolymer.

6. A process as defined in claim 5, wherein the dispersion is formed of a perfluorosulfonic acid ionomer of the formula

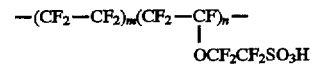

wherein m and n are the same or different and wherein the ionomer has an equivalent weight of from 550 to 1000, the substrate is in powdered form, fibrous form or is a combination of powdered and fibrous materials, the ionomer solids in the dispersion are combined with the polymeric substrate in a ratio by weight of 0.015 to 1 or greater on a dry basis, and the mixture of the dispersion, salt or acid solution and polymeric substrate is sheared with a blade on a blending device at a tip speed of 800 feet per minute or greater.

7. A process as defined in claim 6, wherein the perfluorosulfonic acid ionomer has an equivalent weight of from 550 to 800.

8. A process as defined in claim 7, wherein the substrate is polytetrafluoroethylene.

9. A process as defined in any one of claims 1 and 2–4, and further comprising exchanging the cation of the ionomer coated on said substrate, by contacting the coated substrate with a solution containing a different cation.

10. A process as defined in claim 9 further comprising heat treating the coated substrate, then contacting the heat-treated, coated substrate with a colloidal dispersion or solution of the same or a different ionomer and then contacting the substrate with a solution of a salt or of a strongly ionizing acid, each of a sufficient concentration to cause an additional coating of ionomer to be formed on the substrate.

11. A process as defined in claim 10, which further comprises annealing the coated substrate at the glass transition temperature of the ionomer or greater, after the application of the additional coating.

12. A process as defined in claim 11, wherein the annealing of the coated substrate occurs at the crystalline melting point of the polymeric substrate.

* * * * *